(12) United States Patent
Seno et al.

(10) Patent No.: US 10,119,571 B2
(45) Date of Patent: Nov. 6, 2018

(54) SEALING DEVICE

(71) Applicant: UCHIYAMA MANUFACTURING CORP., Okayama-shi, Okayama (JP)

(72) Inventors: Hiroshi Seno, Akaiwa (JP); Ai Shiotsuka, Akaiwa (JP)

(73) Assignee: UCHIYAMA MANUFACTURING CORP., Okayama (JP)

( * ) Notice: Subject to any disclaimer, the term of this patent is extended or adjusted under 35 U.S.C. 154(b) by 472 days.

(21) Appl. No.: 14/750,360

(22) Filed: Jun. 25, 2015

(65) Prior Publication Data

US 2016/0003302 A1 Jan. 7, 2016

(30) Foreign Application Priority Data

Jul. 1, 2014 (JP) ................... 2014-135488

(51) Int. Cl.
*F16J 15/447* (2006.01)
*F16C 33/80* (2006.01)
(Continued)

(52) U.S. Cl.
CPC ........ *F16C 33/805* (2013.01); *F16C 33/7886* (2013.01); *F16C 33/80* (2013.01);
(Continued)

(58) Field of Classification Search
CPC .... F16C 33/805; F16C 33/7886; F16C 33/80; F16C 2326/02; F16C 33/00;
(Continued)

(56) References Cited

U.S. PATENT DOCUMENTS

2007/0031079 A1* 2/2007 Komori ................... B60B 27/00
384/589
2007/0278748 A1 12/2007 Matsui et al.
(Continued)

FOREIGN PATENT DOCUMENTS

JP 2001165179 A 6/2001
JP 2010096217 A 4/2010
(Continued)

*Primary Examiner* — Nathan Cumar
(74) *Attorney, Agent, or Firm* — Rankin, Hill & Clark LLP

(57) ABSTRACT

A sealing device configured to seal a gap on a flange portion side between an outer member and an inner member by being attached to the outer member. A circular plate portion of a metal ring has an extending portion extending opposite to a flange portion. A seal body has a projecting portion and a weir portion, the projecting portion being positioned inward in a diametrical direction from the extending portion and extending toward the flange portion, the weir portion being positioned outward in a diametrical direction from the extending portion and extending toward the flange portion. The projecting portion and the weir portion overlap the extending portion in a diametrical direction, the projecting portion and the weir portion being provided adjacent to the extending portion, thereby forming a labyrinth. The labyrinth has a plurality of labyrinth constituting portions folding back along inner and outer faces of the extending portion in a diametrical direction, and the labyrinth is configured to meander.

14 Claims, 8 Drawing Sheets

(51) Int. Cl.
*F16J 15/3232* (2016.01)
*F16J 15/3264* (2016.01)
*F16C 33/78* (2006.01)

(52) U.S. Cl.
CPC ....... *F16J 15/3232* (2013.01); *F16J 15/3264* (2013.01); *F16J 15/4476* (2013.01); *F16C 2326/02* (2013.01)

(58) Field of Classification Search
CPC .. F16J 15/3232; F16J 15/3264; F16J 15/4476; F16J 15/447; F16J 15/00
USPC .......................................................... 277/351
See application file for complete search history.

(56) References Cited

U.S. PATENT DOCUMENTS

| | | | | |
|---|---|---|---|---|
| 2009/0127796 | A1* | 5/2009 | Kanzaki | F16J 15/3264 277/562 |
| 2013/0127119 | A1* | 5/2013 | Haepp | F16C 33/7863 277/351 |
| 2013/0241270 | A1* | 9/2013 | Morita | F16C 33/805 301/110 |
| 2014/0003753 | A1* | 1/2014 | Haepp | F16C 33/7886 384/480 |

FOREIGN PATENT DOCUMENTS

| | | |
|---|---|---|
| JP | 2013-072553 A | 4/2013 |
| JP | 2013-534301 A | 9/2013 |
| JP | 2013-234748 A | 11/2013 |
| WO | WO2006008898 A1 | 1/2006 |

\* cited by examiner

SEALING DEVICE

TECHNICAL FIELD

The present invention relates to a sealing device, for instance, used for a mechanical device such as a bearing device of a wheel supporting portion of a vehicle. More specifically, the present invention relates to the sealing device mounted between an inner ring and an outer ring on a flange portion side of the bearing device wherein the inner ring with a flange is supported rotatably and coaxially to the outer ring.

BACKGROUND ART

Recently, a hub bearing has been widely used as the bearing device of the wheel supporting portion of the vehicle (e.g. referring to Patent Literatures 1 to 3). The hub bearing is configured in such a manner that the inner ring with a flange to which the wheel is attached is supported rotatably and coaxially to the outer ring fixed to a vehicle body. The sealing device preventing the intrusion of muddy water, dust and the like (hereinafter referred altogether to as muddy water) into a bearing space or preventing the leakage of lubricant (grease and the like) filled in the bearing space is mounted on both end portions of the outer ring and the inner ring in an axial direction. The sealing device on a flange side (a wheel side, an outer side) of the bearing device for the wheel shown in Patent Literatures 1 to 3 includes a core member fitted to the outer ring, and a seal body made of an elastic material such as rubber fixed to the core member. The seal body includes a seal lip elastically contacting the inner ring directly or through a slinger (a metal ring).

In the sealing device, dust gets stuck into an elastic contacting portion of the seal lip and the inner ring when muddy water intrudes into the sealing device from a gap between the seal body and the flange portion of the inner ring. When the inner ring continues rotating under the condition that dust gets stuck into the elastic contacting portion, a distal end portion of the seal lip is worn away and a seal function of the bearing space deteriorates over time due to a mutual slidable contact between the seal lip and the inner ring. Patent Literature 1 discloses the sealing device in which the seal body includes the seal lip directly and elastically contacting the inner ring and a labyrinth lip extending into a recessed groove formed at the flange portion on the outer diametrical side of the seal lip. FIG. 2 of Patent Literature 2 illustrates a seal assembly constituted with a cover member (the core member and the seal body) fitted to the outer ring and an abutting member (the metal ring) fitted along the inner ring. The cover member has the seal lip elastically contacting the abutting member, the seal lip not contacting the abutting member, and a projecting portion provided so as to project to the outer diametrical side of the outer ring. In the cover member, a labyrinth seal is formed by a part of the abutting member, the seal lip not contacting the abutting member, and the projecting portion. Furthermore, Patent Literature 3 discloses a sealing structure constituted with the metal ring fitted to the inner ring along the flange portion and a sealing member fitted to the outer ring having the seal lip elastically contacting the metal ring. It is disclosed that the metal ring is provided on its outer diametrical side with a folding portion projecting to the opposite side of the flange portion, the outer ring (an outer member) includes an extending portion located outward in a diametrical direction from the folding portion, and a labyrinth is formed by the folding portion and the extending portion.

PRIOR ART CITATION

Patent Citation

PTL 1: Japanese Patent Publication (not examined)
PTL 2: Japanese Translation of PCT International Application Publication No. JP-T-2013-534301
PTL 3: Japanese Patent Publication (not examined) No. 2013-234748

SUMMARY OF INVENTION

Technical Problem

Since each sealing device disclosed in PTL1 to 3 has the labyrinth on the outer diametrical side of the elastic contacting portion of the seal lip and the inner ring (the metal ring), the intrusion of muddy water into the sealing device is inhibited, and the frequency of dust-sticking into the elastic contacting portion is reduced. Accordingly, the abrasion of the seal lip due to the slidable contact of the seal lip and the inner ring is inhibited, which increases the persistence of the seal function. However, the sealing devices disclosed in PTL1 to 3 are not sufficient structurally for preventing the intrusion of muddy water. And still there is a concern for biting of dust and the like in the elastic contacting portion. Hence a sealing device capable of preventing the intrusion of muddy water more effectively has been desired.

The present invention is proposed in view of the above-mentioned problems and has an object to provide a sealing device capable of preventing the intrusion of muddy water more effectively.

Solution to Problem

A sealing device of the present invention is configured to be provided for a mechanical apparatus having an inner member with a flange portion continuously enlarging in a diametrical direction and an outer member rotating relative to the inner member around a shaft of the mechanical apparatus, the sealing device being configured to seal a gap on the flange portion side between the outer member and the inner member by being attached to the outer member. The sealing device has a core member attached to the outer member, a seal body fixed to the core member, and a metal ring having a cylindrical portion fitted to the inner member and having a circular plate portion extending outward in a diametrical direction from an end portion on the flange portion side of the cylindrical portion. The circular plate portion has an extending portion extending opposite to the flange portion. The seal body has a projecting portion and a weir portion, the projecting portion being positioned inward in a diametrical direction from the extending portion and extending toward the flange portion, the weir portion being positioned outward in a diametrical direction from the extending portion and extending toward the flange portion. The projecting portion and the weir portion overlap the extending portion in a diametrical direction, the projecting portion and the weir portion being provided adjacent to the extending portion, thereby forming a labyrinth. The labyrinth includes a plurality of labyrinth constituting portions folding back along inner and outer faces of the extending portion in a diametrical direction, and the labyrinth is configured to meander.

In the present invention, the projecting portion and the weir portion of the seal body are adjacent to the extending portion of the metal ring in inward and outward diametrical directions, thereby the labyrinth is formed. The labyrinth inhibits the intrusion of muddy water into the bearing seal. Moreover, the labyrinth includes a plurality of labyrinth constituting portions folding back along the inner and outer faces of the extending portion in a diametrical direction and the labyrinth has a meandering shape. An intrusion route of muddy water becomes a route folding back along the extending portion, so that the intrusion blocking function of muddy water into the sealing device is more effectively exerted.

In the present invention, the extending portion can be configured to extend in parallel with the shaft, and the labyrinth can have a first labyrinth constituting portion and a second labyrinth constituting portion, the first labyrinth constituting portion being configured to be parallel with the extending portion between the weir portion and the extending portion, the second labyrinth constituting portion being configured to be parallel with the extending portion between the projecting portion and the extending portion.

In the present invention, the extending portion of the metal ring is parallel with the shaft and the first labyrinth constituting portion and the second labyrinth constituting portion are parallel with the extending portion, so that the labyrinth constituting portions are parallel with the shaft, thereby the intrusion route of muddy water includes a route parallel with the shaft. Accordingly, a meandering angle of the meandering labyrinth becomes almost 90 degrees and the intrusion blocking function of muddy water into the sealing device is more remarkably exerted.

In the present invention, the weir portion can be adjacent to the flange portion and the labyrinth can further have an adjacent portion of the weir portion and the flange portion as a labyrinth constituting portion.

In the present invention, the adjacent portion adjacent to the weir portion and the flange portion is added as the labyrinth constituting portion of the meandering labyrinth, so that the intrusion blocking function of muddy water into the sealing device is more remarkably exerted by a synergetic effect of the above-mentioned labyrinth constituting portion formed by the adjacent portion.

In the present invention, the projecting portion can be adjacent to the circular plate portion and the labyrinth can further have an adjacent portion of the projecting portion and the circular plate portion as a labyrinth constituting portion.

In the present invention, the adjacent portion adjacent to the projecting portion and the circular plate portion is added as the labyrinth constituting portion of the meandering labyrinth, so that the intrusion blocking function of muddy water into the sealing device is more remarkably exerted by a synergetic effect of the above-mentioned labyrinth constituting portion formed by the adjacent portion.

In the present invention, the core member can have a cylindrical portion fitted to an outer circumference of the outer member and a circular plate portion extending inward in a diametrical direction from the end portion on the flange portion side of the cylindrical portion. The seal body can have a cover portion covering the cylindrical portion, and the weir portion can be configured to be integral with the cover portion and to be greater in diameter than the cover portion.

In the present invention, muddy water flowing along the outer circumference of the outer member and the cover portion is dammed by the weir portion. Accordingly, the frequency of reaching of muddy water to the labyrinth is reduced and the intrusion blocking function of muddy water into the sealing device is more effectively exerted.

A sealing device of the present invention is configured to be provided for a mechanical apparatus having an inner member with a flange portion continuously enlarging in a diametrical direction and an outer member rotating relative to the inner member around a shaft of the mechanical apparatus, the sealing device being configured to seal a gap on the flange portion side between the outer member and the inner member by being attached to the outer member. The sealing device has a core member attached to the outer member and a seal body fixed to the core member. The flange portion has an eave portion extending toward the seal body side. The seal body has a projecting portion and a weir portion, the projecting portion being positioned inward in a diametrical direction from the eave portion and extending toward the flange portion, the weir portion being positioned outward in a diametrical direction further than the eave portion and extending toward the flange portion. The projecting portion and the weir portion overlap the eave portion in a diametrical direction, and the projecting portion and the weir portion are provided adjacent to the eave portion, thereby forming the labyrinth. The labyrinth includes a plurality of labyrinth constituting portions folding back along inner and outer faces of the eave portion in a diametrical direction, and the labyrinth is configured to meander.

According to the present invention, the projecting portion and the weir portion of the seal body are adjacent to the eave portion of the flange portion in inward and outward diametrical directions, thereby the labyrinth is formed. The labyrinth inhibits the intrusion of muddy water into the sealing device. Moreover, the labyrinth constituting portions of the labyrinth are configured to fold back along the inner and outer faces of the eave portion in a diametrical direction. The intrusion route of muddy water becomes a route folding back along the eave portion, so that the intrusion blocking function of muddy water into the sealing device is more effectively exerted.

Advantageous Effects of Invention

The sealing device of the present invention prevents the intrusion of muddy water into the sealing device effectively and improves the seal function of the gap between the outer member and the inner member.

DESCRIPTION OF EMBODIMENTS

Figure 1:
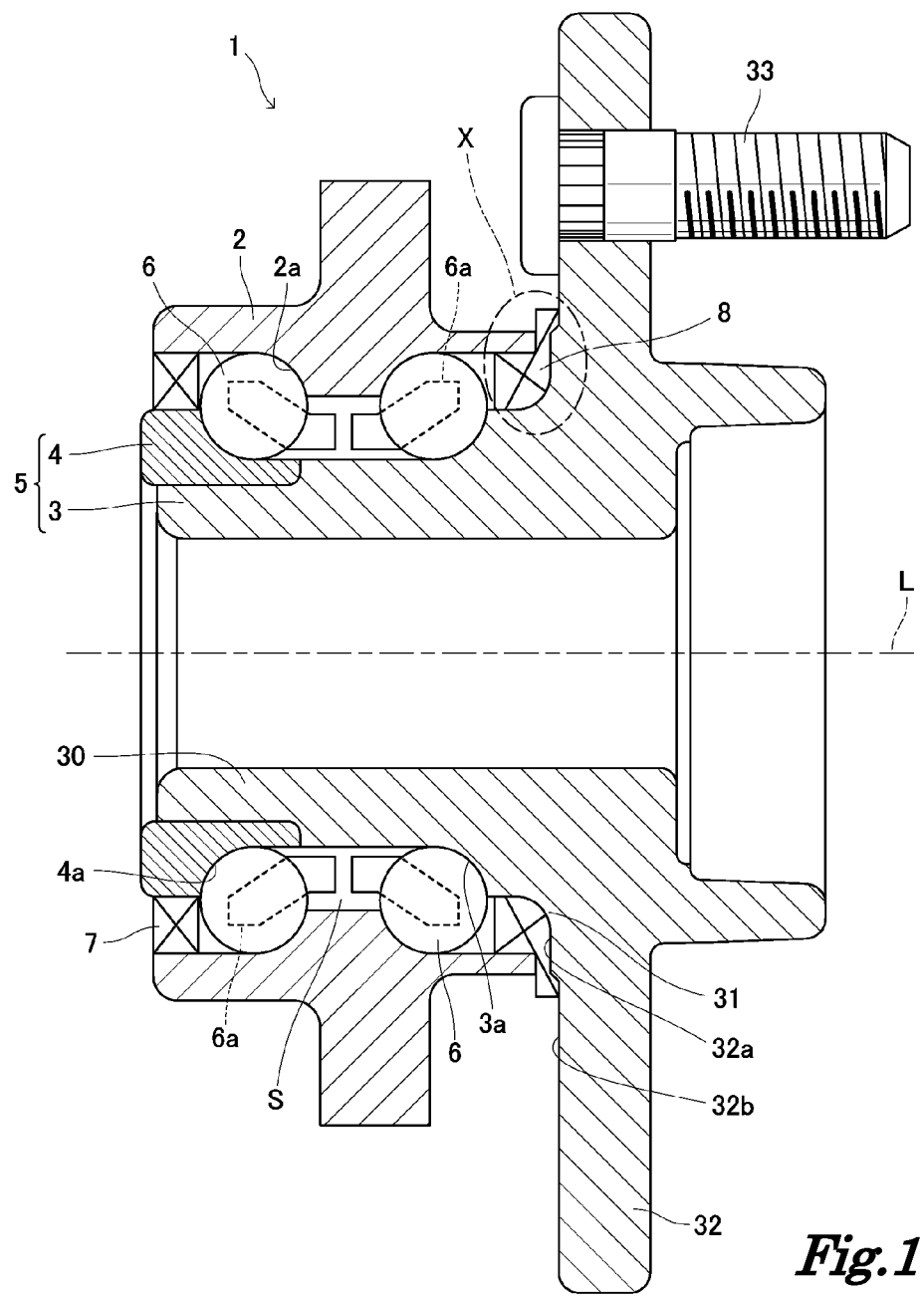
FIG. 1 is a diagram of a longitudinal sectional view and shows an example of a bearing device to which the sealing device of the present invention is attached.

An embodiment of the present invention is explained below based on the drawings. FIG. 1 shows a bearing device (a mechanical device) 1 rotatably and axially supporting a wheel of a vehicle (not shown). The bearing device 1 generally includes an outer ring 2 as an outer member, a hub wheel 3, an inner ring member 4 integrally fitted on a vehicle body side of the hub wheel 3, and two rows of rolling elements (balls) 6 . . . interposed between the outer ring 2 and the hub wheel 3, and between the outer ring 2 and the inner ring member 4. In the embodiment, an inner ring 5 as an inner member is constituted with the hub wheel 3 and the inner ring member 4. The outer ring 2 is fixed to a vehicle body (not shown). A drive shaft (not shown) is spline-fitted coaxially to the hub wheel 3. The inner ring 5 (the hub wheel 3 and the inner ring member 4) is rotatable around a shaft L to the outer ring 2. The outer ring 2 and the inner ring 5 are constituted as two members rotating relatively and coaxially. An annular gap S is formed between the two members. Under the condition of being held by a retainer 6a in the gap S, the two rows of the rolling elements 6 . . . are interposed so that a track wheel 2a of the outer ring 2, a track wheel 3a of the hub wheel 3, and a track wheel 4a of the inner ring member 4 are capable of rolling therein. The hub wheel 3 has a hub wheel body 30 in a cylindrical shape and a flange portion (a hub flange) 32 formed so as to expand the diameter continuously outward in a diametrical direction through a rising base portion 31 from the hub wheel body 30. The wheel is attached and fixed to the flange portion 32 with a bolt 33 and a nut (not shown). A flange face facing toward the gap S side of the flange portion 32 in the figure has a first flange face 32a extending to a rising base portion 31 and a second flange face 32b continuously formed in a stepped shape (away from the gap S along the shaft L) from the outer diametrical side of the first flange face 32a.

In the specification, a side facing toward the wheel along the shaft L direction (a side facing toward the right side in FIG. 1) is referred to as a wheel side. The other side facing toward the vehicle body (a side facing toward the left side in FIG. 1) is referred to as a vehicle body side.

The annular gap (hereinafter referred to as the bearing space S) forms a bearing space and the bearing seals 7,8 are mounted in both end portions along the shaft L direction of the annular gap between the outer ring 2 and the hub wheel 3, and between the outer ring 2 and the inner ring member 4. Both end portions along the shaft L direction of the bearing space S are sealed by the bearing seals 7, 8. Thereby, the intrusion of muddy water into the bearing space S and the leakage of lubricant (grease and the like) filled into the bearing space S are prevented. The bearing seal 8 mounted on the wheel side (the flange portion 32 side) corresponds to the sealing device of the present invention. Embodiments of the bearing seal (the sealing device) 8 are explained below referring to FIG. 2 to FIG. 8.

Figure 2:
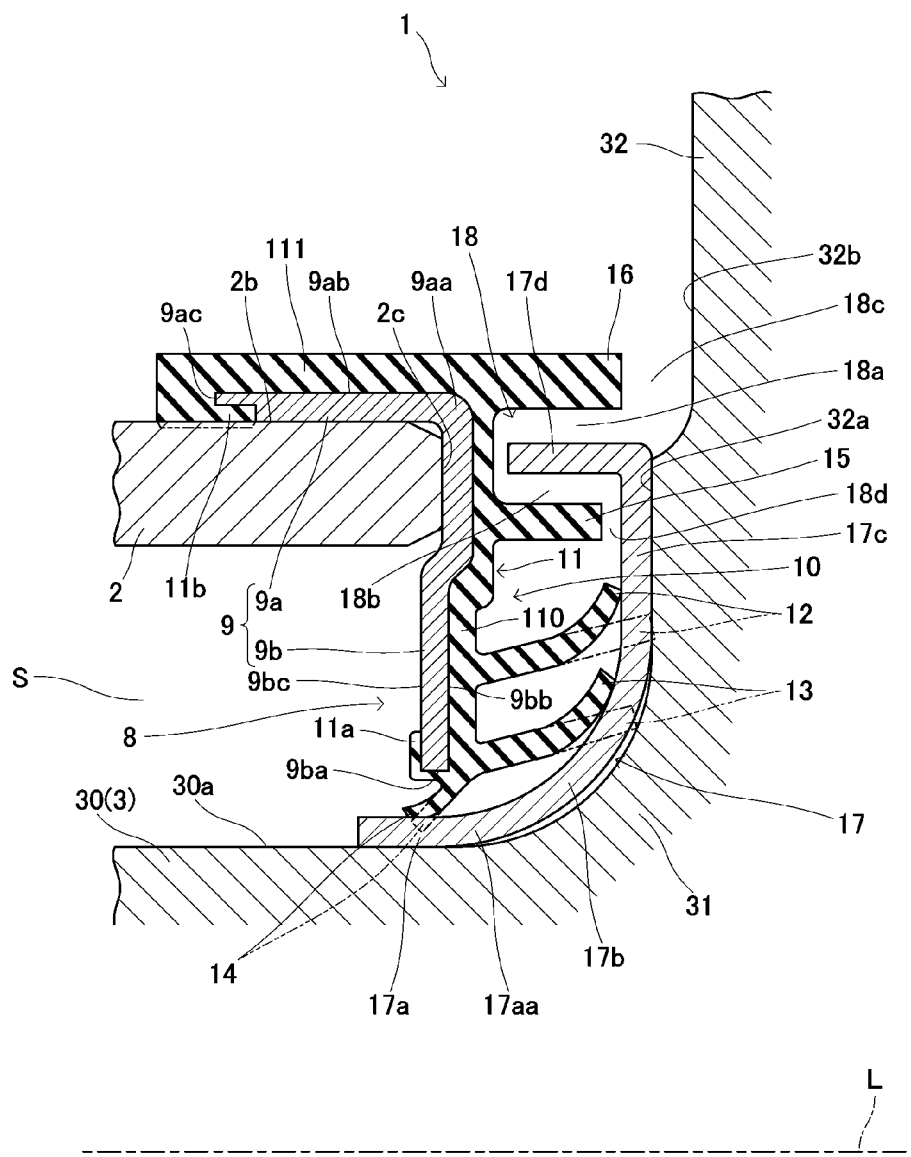
FIG. 2 is an enlarged view of the area "X" in FIG. 1 and shows a first embodiment of the sealing device of the present invention.

FIG. 2 shows the first embodiment. The bearing seal 8 in the figure includes a core member 9 attached to an outer circumferential face 2b of the outer ring 2 by fitting, and a seal body 10 made of an elastic material such as rubber fixed to the core member 9. The core member 9 has a cylindrical portion of the core member 9a fitted to the outer circumferential face 2b of the outer ring 2 (fitted onto the outer ring 2), and a circular plate portion of the core member 9b extending inward in a diametrical direction from an end portion 9aa on the flange portion 32 side of the cylindrical portion of the core member 9a. The cylindrical portion of the core member 9a is fitted onto the outer ring 2 in such a manner that the circular plate portion of the core member 9b abuts against an end face on wheel side 2c of the outer ring 2. The seal body 10 includes a seal body base portion 11 fixed to the core member 9, and three pieces of seal lips 12, 13, 14 provided so as to elastically contact a metal ring 17 to be mentioned below and to project from the seal body base portion 11. The seal body base portion 11 is fixed to the core member 9 so as to coat the parts from an end edge portion on inner diametrical side 9ba to a face on wheel side 9bb of the circular plate portion of the core member 9b and the parts from an outer circumferential face 9ab to an end edge portion on vehicle body side 9ac of the cylindrical portion of the core member 9a. Furthermore, the seal body base portion 11 is fixed to the core member 9 in such a manner that a part 11a of the seal base portion 11 extends to a face on vehicle body side 9bc entering into the end edge portion on inner diametrical side 9ba of the circular plate portion of the core member 9b. The seal body base portion 11 is fixed to the core member 9 in such a manner that a part 11b of the seal base portion 11 enters into the end edge portion on vehicle body side 9ac of the cylindrical portion of the core member 9a, and the part 11b is provided in a compressed state between the end edge portion on vehicle body side 9ac and the outer circumferential face 2b of the outer ring 2. The seal body 10 includes a projecting portion 15 formed on an outer side further than the seal lip 12 on the largest diameter side and provided so as to extend toward the flange portion 32 side, and a weir portion 16 formed on a larger diameter side than the projecting portion 15 and provided so as to extend toward the flange portion 32 side. The projecting portion 15 is integrally formed parallel to the shaft L with a section 110 covering the circular plate portion of the core member 9b of the seal body base portion 11. The weir portion 16 is integrally formed parallel to the shaft L with a section (hereinafter referred to as the cover portion) 111 covering the cylindrical portion of the core member 9a of the seal body base portion 11. The outer diameter of the weir portion 16 and that of the cover portion 111 are the same in length.

The metal ring 17 is fitted to the hub wheel 3. The metal ring 17 contains a cylindrical portion 17a fitted to an outer circumferential face 30a of the hub wheel body 30 and a circular plate portion 17c extending outward in a diametrical direction through a rising base portion 17b in a curved shape from an end portion 17aa on the flange portion side 32 of the cylindrical portion 17a. The circular plate portion 17c of the metal ring 17 contains an extending portion 17d extending to the opposite side (the vehicle body side) of the flange portion 32 from an end portion on outer diametrical side of the circular plate portion 17c. The bearing seal 8 of the embodiment is constituted with the core member 9, the seal body 10, and the metal ring 17. In the metal ring 17 of the embodiment, the cylindrical portion 17a, the rising base portion 17b, the circular plate portion 17c, and the extending portion 17d are formed integrally by a non-rusting material such as a stainless steel plate. In the embodiment, the metal ring 17 is fitted to the hub wheel 3 in such a manner that the circular plate portion 17c tightly adheres to the first flange face 32a of the flange portion 32. In the three pieces of seal lips 12, 13, 14 constituting the seal body 10, the seal lips 12, 13 are axial lips and elastically contact the circular plate portion 17c of the metal ring 17. The seal lip 14 is a radial lip and elastically contacts the cylindrical portion 17a of the metal ring 17. In FIG. 2, a section illustrated with a two-dot chain line of the seal lips 12, 13, 14 shows an original form before elastic deformation.

The projecting portion 15 and the weir portion 16 contained in the seal body 10, provided adjacent to the extending portion 17d of the metal ring 17, overlap in a diametrical direction, thereby forming a labyrinth 18, namely a gap formed like a labyrinth. The labyrinth 18 contains a plurality of labyrinth constituting portions folding back along both inward and outward faces in a diametrical direction of the extending portion 17d and is formed in a meandering shape. That is, the labyrinth 18 is formed in a meandering shape folding back along the inward face and the outward face in a diametrical direction of the extending portion 17d. In the embodiment, the extending portion 17d is formed so as to extend parallel to the shaft L. The labyrinth 18 contains a first labyrinth constituting portion 18a formed between the weir portion 16 and the extending portion 17d parallel to the extending portion 17d and a second labyrinth constituting portion 18b formed between the projecting portion 15 and the extending portion 17d parallel to the extending portion 17d. While the first labyrinth constituting portion 18a is formed outward in a diametrical direction relative to the extending portion 17d, the second labyrinth constituting portion 18b is formed inward in a diametrical direction relative to the extending portion 17d. Furthermore, the weir portion 16 is close to the flange portion 32, and the labyrinth 18 contains an adjacent portion of the weir portion 16 and the flange portion 32 as a third labyrinth constituting portion 18c. The projecting portion 15 is adjacent to the circular plate portion 17c of the metal ring 17, and the labyrinth 18 contains an adjacent portion of the projecting portion 15 and the circular plate portion 17c as a fourth labyrinth constituting portion 18d. The third labyrinth constituting portion 18c communicates with the first labyrinth constituting portion 18a. The fourth labyrinth constituting portion 18d communicates with the second labyrinth constituting portion 18b and the bearing seal 8. The labyrinth 18 contains the labyrinth constituting portions 18a, 18b, 18c, 18d and is formed in a meandering shape with a meandering angle close to 90°.

In the bearing device 1 which includes the bearing seal 8 constituted as above, the seal lips 12, 13, 14 contact the metal ring 17 relatively and slidably in an elastic manner when the inner ring 5 rotates around the shaft L. Thereby, a flange portion side of the bearing space S is sealed. The projecting portion 15 and the weir portion 16 of the seal body 10 are provided adjacent to the extending portion 17d of the metal ring 17 inward and outward diametrical directions, thereby the labyrinth 18 is formed. By the labyrinth 18, the intrusion of muddy water into the bearing seal 8 is inhibited. Moreover, the labyrinth 18 contains the first labyrinth constituting portion 18a and the second labyrinth constituting portion 18b and is formed in the meandering shape folding back along the inward face and the outward face in a diametrical direction of the extending portion 17d. Accordingly, the intrusion route of muddy water becomes a route folding back along the extending portion 17d. Since the labyrinth 18 is configured to cause muddy water to fail to reach inside the bearing seal 8 without changing a direction at least one time, the intrusion blocking function of muddy water into the bearing seal 8 is more effectively exerted. Due to the fact that the intrusion blocking of muddy water into the bearing seal 8 is more effectively exerted, the frequency of dust-sticking into the elastic contacting portion of the seal lips 12, 13, 14 to the metal ring 17 is reduced. Thereby, abrasion due to the slidable contact of the seal lips 12, 13, 14 to the metal ring 17 is hardly caused and lifetime of the bearing seal 8 is prolonged. In addition, the meandering shape becomes more remarkable and the intrusion route of muddy water becomes longer since the labyrinth 18 also contains the third labyrinth constituting portion 18c communicating with the first labyrinth constituting portion 18a and the fourth labyrinth constituting portion 18d communicating with the second labyrinth constituting portion 18b. Accordingly, the intrusion blocking function of muddy water into the bearing seal 8 is more effectively exerted by the labyrinth 18. The core member 9 is not exposed to muddy water from outside and the generation of rust is prevented since the seal body base portion 11 of the seal body 10 is fixed to the core member 9 as above. Also the intrusion of muddy water flowing along the outer circumferential face 2b of the outer ring 2 into the fitting portion of the cylindrical portion of the core member 9a and the outer ring 2 is prevented.

Figure 3:
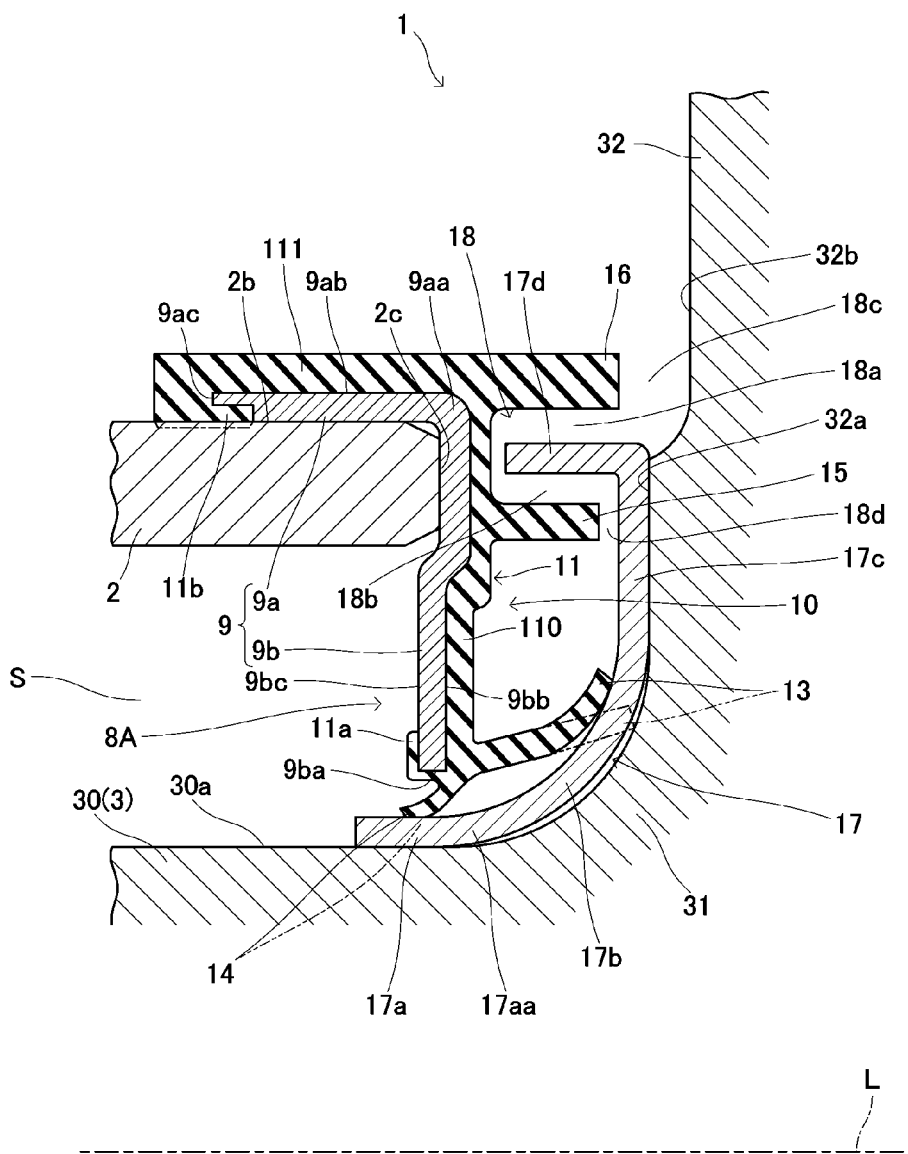
FIG. 3 shows a modified example of the above-mentioned embodiment and is a view similar to the view in FIG. 2.

FIG. 3 shows a modified example of the first embodiment. A bearing seal (a sealing device) 8A in the example differs from the bearing seal 8 shown in FIG. 2 in that the axial lip 12 does not exist in the bearing seal 8A. The labyrinth 18 is constituted in a similar manner to the embodiment shown in FIG. 2 and the intrusion blocking function of muddy water is similarly exerted. Accordingly, a seal function of the bearing seal 8A does not deteriorate even without the axial lip 12, rather the lack of the axial lip 12 leads to an advantage of reducing rotational torque in the inner ring 5.

Other structures are the same as the embodiment shown in FIG. 2, common portions are allotted with the same reference numerals and the explanation for the effects is omitted here.

Figure 4:
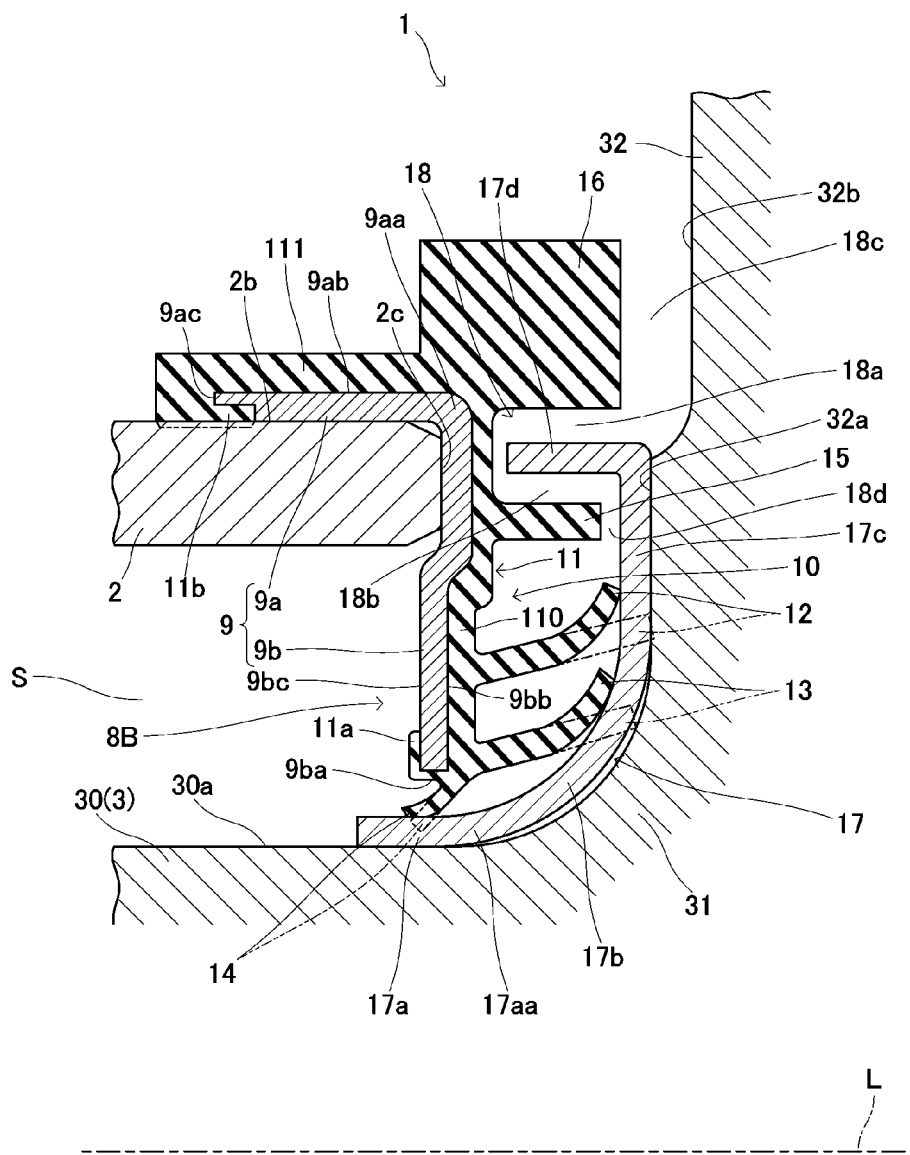
FIG. 4 shows a second embodiment of the sealing device of the present invention and is a view similar to the view in FIG. 2.

FIG. 4 shows the second embodiment of the sealing device of the present invention. A bearing seal (a sealing device) 8B in the example differs from the bearing seal 8 shown in FIG. 2 in that the weir portion 16 is formed larger in diameter than that of the cover portion 111 coating the cylindrical portion of the core member 9a in the seal body base portion 11. Muddy water flowing along the outer circumferential face 2b of the outer ring 2 and the cover portion 111 is dammed by the weir portion 16 because the weir portion 16 is formed larger in diameter than that of the cover portion 111. Accordingly, the frequency of reaching of muddy water to the labyrinth 18 is reduced, and the intrusion blocking function of muddy water into the bearing seal 8B is more effectively exerted. The weir portion 16 in the figure is formed thicker in a diametrical direction than that of the embodiment shown in FIG. 2 because the weir portion 16 is larger in diameter than that of the embodiment shown in FIG. 2. Therefore, the length along a diametrical direction of the third labyrinth constituting portion 18c formed by the adjacent portion of the weir portion 16 and the flange portion 32 becomes large, and the intrusion route of muddy water into the bearing seal 8 becomes longer. As a result, the intrusion blocking function of muddy water by the labyrinth 18 is more effectively exerted.

Other structures are the same as the embodiment shown in FIG. 2, common portions are allotted with the same reference numerals and the explanation for the effects is omitted here.

Figure 5:
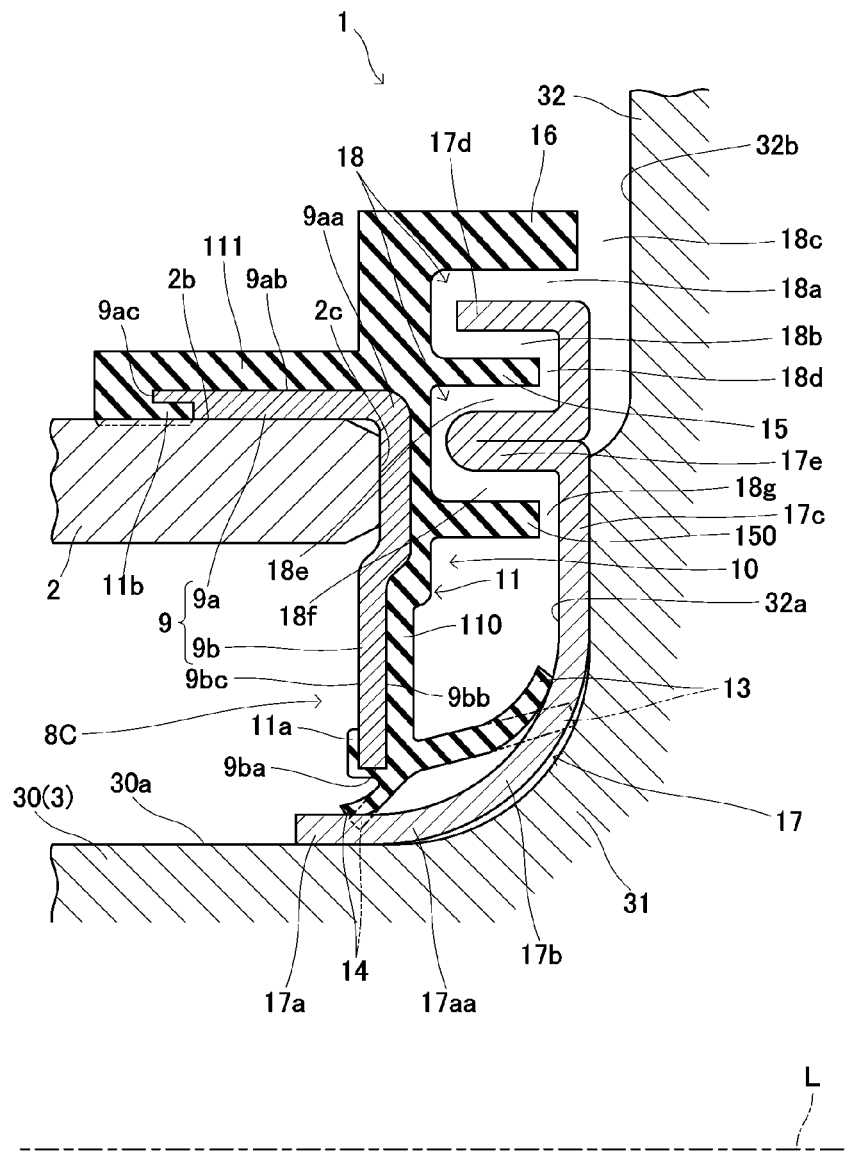
FIG. 5 shows a modified example of the above-mentioned embodiment and is a view similar to the view in FIG. 2.

FIG. 5 shows a modified example of the second embodiment. In a bearing seal (a sealing device) 8C, the weir portion 16 is formed thinner in a diametrical direction than the embodiment shown in FIG. 4 while the weir portion 16 is formed larger in diameter than the cover portion 111 in the same manner as the embodiment shown in FIG. 4. The bearing seal 8C differs from the bearing seal 8B shown in FIG. 4 in that the axial lip 12 does not exist in the bearing seal 8C. The labyrinth 18, the same as each example above, is formed by the projecting portion 15 and the weir portion 16 of the seal body 10 and the extending portion 17d of the metal ring 17. The labyrinth 18 in the example is located outward in a diametrical direction further than the labyrinth 18 in each example above. In the bearing seal 8C, in addition to the projecting portion 15 and the weir portion 16, the seal body 10 also contains a second projecting portion 150 formed on the inner diametrical side of the projecting portion 15 so as to extend parallel to the shaft L and face toward the flange portion 32 side. In addition to the extending portion 17d, the metal ring 17 contains a second extending portion 17e formed in such a manner that a midway of the circular plate portion 17c extends into the opposite side of the flange portion 32 and parallel to the shaft L and is folded into layers on the inner diametrical side of the extending portion 17d. The projecting portion 15 and the second projecting portion 150, provided close to the second extending portion 17e, overlap in a diametrical direction, thereby forming a second labyrinth 180. The second labyrinth 180 contains a fifth labyrinth constituting portion 18e and a sixth labyrinth constituting portion 18f folding back along both inward and outward faces in a diametrical direction of the second extending portion 17e, and is formed in a meandering shape. The second projecting portion 150 is adjacent to the circular plate portion 17c of the metal ring 17. The second labyrinth 180 further contains an adjacent portion of the second projecting portion 150 and the circular plate portion 17c as a seventh labyrinth constituting portion 18g. The second labyrinth 180 communicates with the labyrinth 18 through the fourth labyrinth constituting portion 18d and is constituted so as to form a part of the labyrinth 18.

In the bearing seal 8C of the example, the labyrinth 18 forms a meandering shape with a lot of bent portions continuing from the third labyrinth constituting portion 18c to the seventh labyrinth constituting portion 18g. Thereby, the intrusion route of muddy water to the bearing seal 8C becomes a route folding back along the extending portion 15 and the second projecting portion 150, and the intrusion blocking function of muddy water into the bearing seal 8C is more effectively exerted.

Other structures are the same as each above-mentioned example, common portions are allotted with the same reference numerals and the explanation for the effects is omitted here as well.

Figure 6:
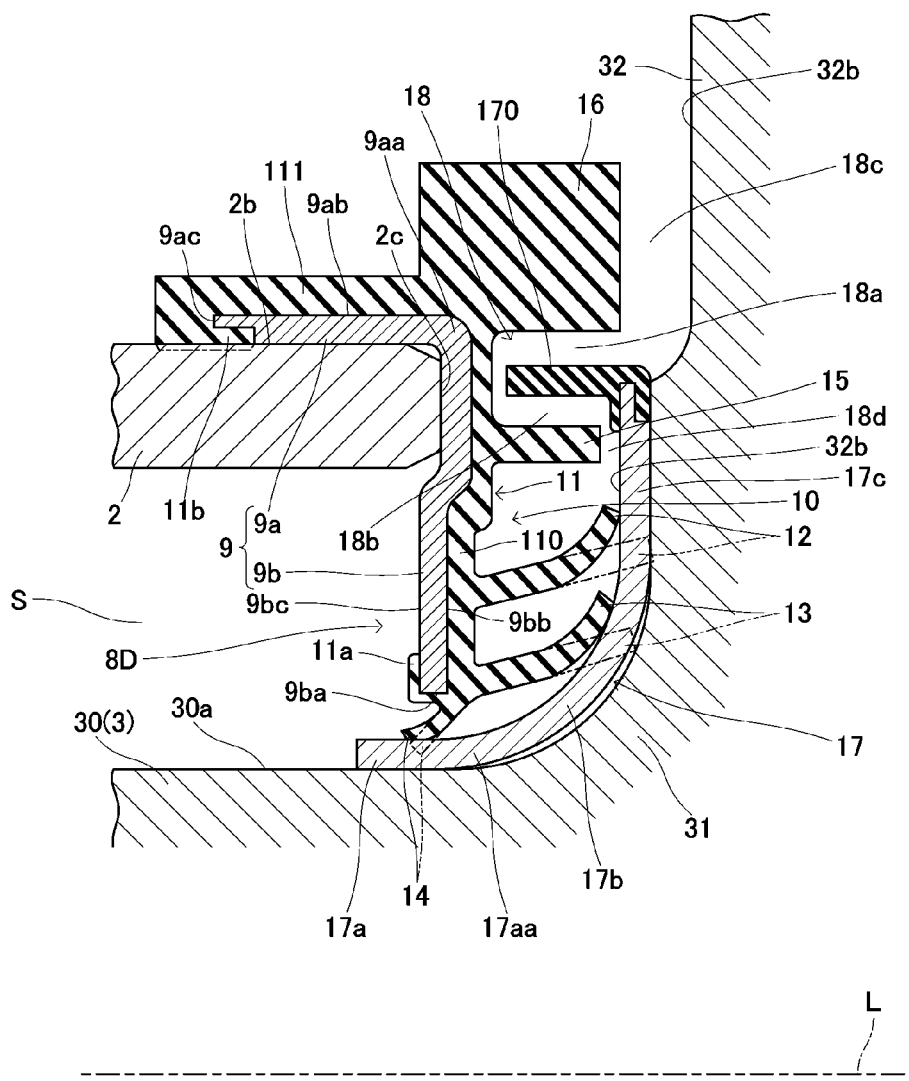
FIG. 6 shows another modified example of the above-mentioned embodiment and is a view similar to the view in FIG. 2.

FIG. 6 shows another modified example of the second embodiment. In a bearing seal (a sealing device) 8D, the circular plate portion 17c of the metal ring 17 contains an extending portion 170 made of a rubber molded body and formed integrally so as to extend to the opposite side (the vehicle body side) of the flange portion 32 in parallel to the shaft L from the end portion on outer diametrical side of the circular plate portion 17c in place of the extending portion 17d of the embodiment shown in FIG. 4. Other structures are the same as the bearing seal 8B shown in FIG. 4. The projecting portion 15 and the weir portion 16, provided close to the extending portion 170, overlap in a diametrical direction, thereby forming the labyrinth 18. The labyrinth 18 contains the first labyrinth constituting portion 18a and the second labyrinth constituting portion 18b folding back along both inward and outward faces in a diametrical direction of the extending portion 170, and is formed in a meandering shape. The labyrinth 18 also exerts the intrusion blocking function of muddy water in the same manner as the embodiment shown in FIG. 4. The extending portion 170 is made of a rubber molded body and is formed integrally by insertion molding of rubber with the metal ring 17 wherein the cylindrical portion 17a, the rising base portion 31, and the circular plate portion 17c are molded beforehand. Thus it is easier to form the extending portion 170 by the insertion molding than by a processing of integrally forming a metal plate, so as to contain the extending portion 17d, by sheet metal working, drawing-machining and the like, in a similar manner to the embodiments shown in FIG. 2 to FIG. 5.

It is possible that the extending portion 170 made of rubber as in the embodiment is provided in place of the extending portion 17d in the embodiments shown in FIG. 2, FIG. 3, and FIG. 5. Other structures are the same as the embodiment shown in FIG. 4, common portions are allotted with the same reference numerals and the explanation for the effects is omitted here as well.

Figure 7:
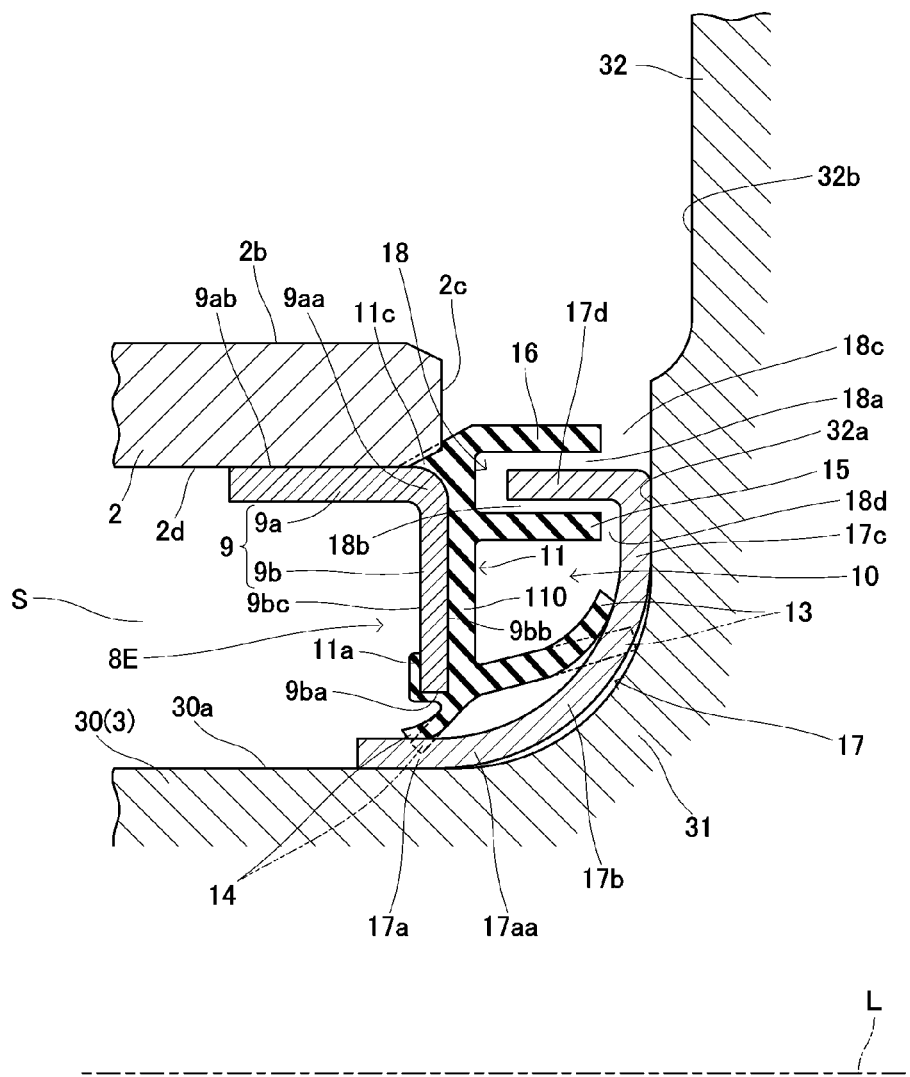
FIG. 7 shows a third embodiment of the sealing device of the present invention and is a view similar to the view in FIG. 2.

FIG. 7 shows the third embodiment of the sealing device of the present invention. In a bearing seal (a sealing device) 8E, the cylindrical portion 9a of the core member 9 is fitted to an inner circumferential face 2d of the outer ring 2 (is fitted into the outer ring 2). The seal body base portion 11 of the seal body 10 is fixed to the core member 9 so as to coat the face on wheel side 9bb of the circular plate portion of the core member 9b ranging over from the end edge portion on inner diametrical side 9ba to the end portion on vehicle body side 9aa of the cylindrical portion of the core member 9a. A section 11c coating the end portion on vehicle body side 9aa of the seal body base portion 11 is provided in a compressed state for the fitting portion of the cylindrical portion of the core member 9a and the outer ring 2. In the section 110 covering the circular plate portion of the core member 9b, two pieces of seal lips 13, 14 in the same manner as the embodiment shown in FIG. 3, the projecting portion 15 and the weir portion 16 extending parallel to the shaft L and facing toward the flange portion 32 side, are integrally formed. The metal ring 17, the same as the embodiments shown in FIG. 2 to FIG. 5, contains the extending portion 17d. In the same manner as each above-mentioned example, the projecting portion 15 and the weir portion 16, provided close to the extending portion 17d, overlap in a diametrical direction, thereby forming the meandering shaped labyrinth 18 containing the labyrinth constituting portions 18a, 18b. Also in the embodiments, the intrusion blocking function of muddy water into the bearing seal 8E is similarly exerted by the labyrinth 18.

Also in the embodiment, it is possible that the extending portion 170 made of rubber as in the embodiment shown in FIG. 6 is provided in place of the extending portion 17d. Other structures are the same as the embodiment shown in FIG. 3, common portions are allotted with the same reference numerals and the explanation for the effects is omitted here as well.

Figure 8:
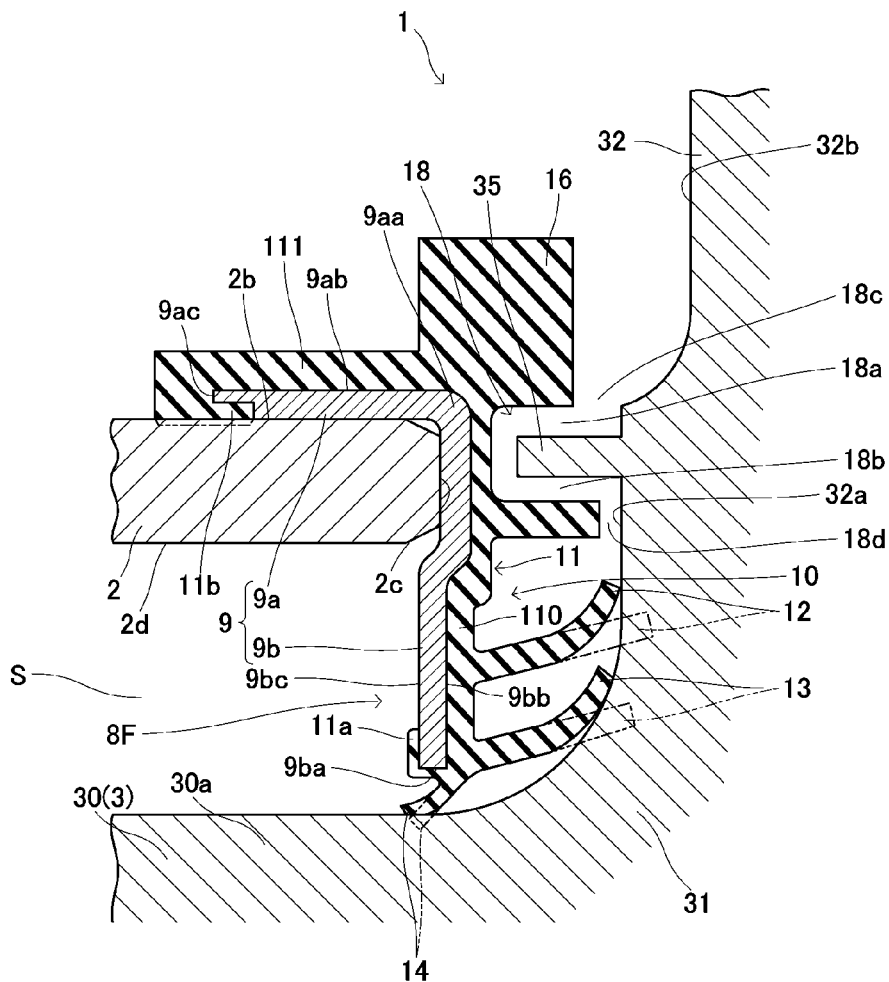
FIG. 8 shows a fourth embodiment of the sealing device of the present invention and is a view similar to the view in FIG. 2.

FIG. 8 shows the fourth embodiment of the sealing device of the present invention. In a bearing seal (sealing device) 8F, the metal ring 17 as shown in the each example above does not exist. The core member 9 similar to the embodiments shown in FIG. 2 to FIG. 6 is attached to the outer ring (the outer member) 2. The seal body 10 similar to the embodiments shown in FIG. 4 and FIG. 6 is fixed to the core member 9. Among the seal lips 12, 13, 14 formed in the seal body 10, the seal lips (the axial lips) 12, 13 contact the first flange face 32a of the flange portion 32 directly and elastically. The seal lip (the radial lip) 14 directly and elastically contacts the outer circumferential face 30a of the hub wheel body 30. The flange portion 32 has an eave portion 35 extending to the vehicle body side (the seal body 10 side) parallel to the shaft L from the first flange face 32a. The projecting portion 15 and the weir portion 16 of the seal body 10, provided close to the eave portion 35, overlap in a diametrical direction, thereby forming the labyrinth 18. The labyrinth 18 contains the labyrinth constituting portions 18a, 18b folding back along both inward and outward faces in a diametrical direction of the eave portion 35, and is formed in a meandering shape. Also in the embodiment, the intrusion blocking function of muddy water into the bearing seal 8F is similarly exerted.

It is possible that the structure of the seal body 10 shown in FIG. 2 and FIG. 3 is applied to the embodiment. Other structures are the same as the embodiment shown in FIG. 4, common portions are allotted with the same reference numerals and the explanation for the effects is omitted here as well.

In the embodiment, it is exemplified that the extending portion 17d, the second extending portion 17e, the extending portion 170 made of rubber, and the eave portion 35 (hereinafter referred altogether to as the extending portion 17d) extend parallel to the shaft L. Each extending portion 17d can be provided in a tapered shape gradually expanding the diameter toward the vehicle body side. The projecting portion 15 and the weir portion 16 are exemplified as being parallel to the extending portion 17d. As long as the meandering shaped labyrinth is formed in such a manner that the projecting portion 15 and the weir portion 16, provided close to the extending portion 17d, overlap in a diametrical direction, it is not necessary for the projecting portion 15 and the weir portion 16 to be parallel to the extending portion 17d. The flange portion 32 having the first flange face 32a and the second flange face 32b in a stepped shape is exemplified as the flange portion; however, the flange portion can include a linear flange face without steps. Furthermore, it is exemplified that the sealing device of the present invention is applied to the bearing device for the vehicle. The sealing device is not limited to this, and can be applied to other mechanical devices as well as long as the sealing device has the inner member with the flange portion and the outer member rotating relatively and coaxially to the inner member. Shapes of the core member and the seal body fixed to the core member are not limited to the shapes in the figures; the fitting shapes of the core member and the outer ring (the outer member) are not limited to the shapes in the figures. Furthermore, the shapes and the number of the axial lips 12, 13 and the radial lip 14 are not limited to those in the figures as well, other forms are also adoptable.

REFERENCE SIGNS LIST 1 bearing device (mechanical device)
2 outer ring (outer member)
5 inner ring (inner member)
32 flange portion
35 eave portion
8,8A to 8F bearing seal (sealing device)
9 core member
9a cylindrical portion of core member
9b circular plate portion of core member
10 seal body
111 cover portion
15 projecting portion
16 weir portion
17 metal ring
17a cylindrical portion
17aa end portion on flange portion side
17c circular plate portion
17d,170 extending portion
18 labyrinth
18a first labyrinth constituting portion
18b second labyrinth constituting portion
18c third labyrinth constituting portion
  (adjacent portion of weir portion and flange portion)
18d fourth labyrinth constituting portion
  (adjacent portion of projecting portion and flange portion)
L shaft
S bearing space (gap)

The invention claimed is:

1. A sealing device configured to be provided for a mechanical apparatus having an inner member with a flange portion continuously enlarging in a diametrical direction and an outer member rotating relative to the inner member around a shaft of the mechanical apparatus, the sealing device being configured to seal a gap between the flange portion and an end face of the outer member facing the flange portion and between the outer member and the inner member by being attached to the outer member, the sealing device comprising:
  a core member attached to the outer member;
  a seal body fixed to the core member; and
  a metal ring having a cylindrical portion fitted to the inner member and having a circular plate portion extending outward in a diametrical direction from an end portion on the flange portion side of the cylindrical portion;
  the circular plate portion having an extending portion extending opposite to the flange portion;
  the seal body having a projecting portion and a weir portion, the projecting portion being positioned inward in a diametrical direction from the extending portion and extending toward the flange portion, the weir portion being positioned outward in a diametrical direction from the extending portion and extending toward the flange portion,
  the projecting portion and the weir portion overlapping the extending portion in a diametrical direction, the projecting portion and the weir portion being provided adjacent to the extending portion, thereby forming a labyrinth, the labyrinth having a plurality of labyrinth constituting portions folding back along inner and outer faces of the extending portion in a diametrical direction, the labyrinth being configured to meander to prevent entry of muddy water, and the core member having a cylindrical portion and a circular plate portion, the cylindrical portion extending inward in the axial direction from an end portion of the cylindrical portion of the core member, the circular plate portion extending inward in a diametrical direction from the end portion of the cylindrical portion of the core member,
  wherein the weir portion projects from the end portion of the cylindrical portion of the core member outward in the axial direction and toward a direction opposite to the direction to which the cylindrical portion of the core member extends in the axial direction, and a projection length of the weir portion in the axial direction from the end portion of the cylindrical portion of the core member is equal to or more than a projection length of the projecting portion in the axial direction, and a length of the labyrinth between the projecting portion and the circular plate portion of the metal ring in the axial direction is smaller than a length of the labyrinth in the diametrical direction.

2. The sealing device as set forth in claim 1, wherein the extending portion is configured to extend in parallel with the shaft, and the labyrinth comprises a first labyrinth constituting portion and a second labyrinth constituting portion, the first labyrinth constituting portion being configured to be parallel with the extending portion between the weir portion and the extending portion, the second labyrinth constituting portion being configured to be parallel with the extending portion between the projecting portion and the extending portion.

3. The sealing device as set forth in claim 1, wherein the labyrinth further comprises an adjacent portion of the weir portion and the flange portion in the axial direction as a labyrinth constituting portion.

4. The sealing device as set forth in claim 1, wherein the projecting portion is adjacent to the circular plate portion of the metal ring and the labyrinth further comprises an adjacent portion of the projecting portion and the circular plate portion of the metal ring as a labyrinth constituting portion.

5. The sealing device as set forth in claim 1, wherein the seal body comprises a cover portion covering the cylindrical portion of the core member, and the weir portion is configured to be integral with the cover portion and to be greater in diameter than the cover portion.

6. A sealing device configured to be provided for a mechanical apparatus having an inner member with a flange portion continuously enlarging in a diametrical direction and an outer member rotating relative to the inner member around a shaft of the mechanical apparatus, the sealing device being configured to seal a gap between the flange portion and an end face of the outer member facing the flange portion and between the outer member and the inner member by being attached to the outer member, the sealing device comprising:
a core member attached to the outer member; and
a seal body fixed to the core member;
the flange portion having an eave portion extending toward the seal body side;
the seal body having a projecting portion and a weir portion, the projecting portion being positioned inward in a diametrical direction from the eave portion and extending toward the flange portion, the weir portion being positioned outward in a diametrical direction further than the eave portion and extending toward the flange portion, and
the projecting portion and the weir portion overlapping the eave portion in a diametrical direction, the projecting portion and the weir portion being provided adjacent to the eave portion, thereby forming a labyrinth, the labyrinth having a plurality of labyrinth constituting portions folding back along inner and outer faces of the eave portion in a diametrical direction, the labyrinth being configured to meander to prevent entry of muddy water, and the core member having a cylindrical portion and a circular plate portion, the cylindrical portion extending inward in the axial direction from an end portion of the cylindrical portion of the core member, the circular plate portion extending inward in a diametrical direction from the end portion of the cylindrical portion of the core member, wherein the weir portion projects from the end portion of the cylindrical portion of the core member outward in the axial direction and toward a direction opposite to the direction to which the cylindrical portion of the core member extends in the axial direction, and a projection length of the weir portion in the axial direction from the end portion of the cylindrical portion of the core member is equal to or more than a projection length of the projecting portion in the axial direction, and a length of the labyrinth between the projecting portion and the circular plate portion of the metal ring in the axial direction is smaller than a length of the labyrinth in the diametrical direction.

7. The sealing device as set forth in claim 2, wherein the labyrinth further comprises an adjacent portion of the weir portion and the flange portion in the axial direction as a labyrinth constituting portion.

8. The sealing device as set forth in claim 2, wherein the projecting portion is adjacent to the circular plate portion of the metal ring and the labyrinth further comprises an adjacent portion of the projecting portion and the circular plate portion of the metal ring as a labyrinth constituting portion.

9. The sealing device as set forth in claim 3, wherein the projecting portion is adjacent to the circular plate portion of the metal ring and the labyrinth further comprises an adjacent portion of the projecting portion and the circular plate portion of the metal ring as a labyrinth constituting portion.

10. The sealing device as set forth in claim 2, wherein the seal body comprises a cover portion covering the cylindrical portion of the core member, and the weir portion is configured to be integral with the cover portion and to be greater in diameter than the cover portion.

11. The sealing device as set forth in claim 3, wherein the seal body comprises a cover portion covering the cylindrical portion of the core member, and the weir portion is configured to be integral with the cover portion and to be greater in diameter than the cover portion.

12. The sealing device as set forth in claim 4, wherein the seal body comprises a cover portion covering the cylindrical portion of the core member, and the weir portion is configured to be integral with the cover portion and to be greater in diameter than the cover portion.

13. The sealing device as set forth in claim 1, wherein the seal body further comprises a cover portion covering the cylindrical portion of the core member, the weir portion being configured to be integral with the cover portion and to be greater in diameter than the cover portion, the weir portion extending, in a direction toward the flange portion, from the end portion of the cylindrical portion of the core member, and the cover portion extending, in a direction away from the flange portion, from the end portion of the cylindrical portion of the core member.

14. The sealing device as set forth in claim 1, wherein an end surface of the weir portion is positioned closer to the flange portion in the axial direction than the end face of the outer member facing the flange portion is.

* * * * *